United States Patent
Sugaya

(10) Patent No.: US 11,164,222 B2
(45) Date of Patent: Nov. 2, 2021

(54) ELECTRONIC BOOK DISPLAY SYSTEM, ELECTRONIC BOOK DISPLAY METHOD, AND PROGRAM

(71) Applicant: OPTiM Corporation, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 45 days.

(21) Appl. No.: 16/479,697

(22) PCT Filed: Mar. 30, 2017

(86) PCT No.: PCT/JP2017/013257
§ 371 (c)(1),
(2) Date: Jul. 22, 2019

(87) PCT Pub. No.: WO2018/179224
PCT Pub. Date: Oct. 4, 2018

(65) Prior Publication Data
US 2021/0090134 A1    Mar. 25, 2021

(51) Int. Cl.
*G06Q 30/00* (2012.01)
*G06Q 30/02* (2012.01)
(Continued)

(52) U.S. Cl.
CPC ..... *G06Q 30/0281* (2013.01); *G06Q 30/0222* (2013.01); *G06Q 30/0643* (2013.01); *G06F 3/0483* (2013.01)

(58) Field of Classification Search
CPC ........... G06Q 30/0281; G06Q 30/0222; G06Q 30/0643; G06F 3/0483
(Continued)

(56) References Cited

U.S. PATENT DOCUMENTS 6,486,895 B1 * 11/2002 Robertson ............. G06F 16/954
715/776
7,509,585 B1 * 3/2009 Gauthier ............. G06F 16/9577
715/762
(Continued)

FOREIGN PATENT DOCUMENTS

| JP | 2012-103894 | 5/2012 |
|----|-------------|--------|
| JP | 2015-170265 | 9/2015 |
| JP | 2016-184246 | 10/2016 |

OTHER PUBLICATIONS

Augmented reality technologies, systems and applications Carmigniani, Julie; Furht, Borko; Anisetti, Marco; Ceravolo, Paolo; Damiani, Ernesto; et al. Multimedia Tools and Applications51.1: 341-377. Springer Nature B.V. (Jan. 2011); Dialog #831660018, 21 pgs.*

*Primary Examiner* — Robert M Pond
(74) *Attorney, Agent, or Firm* — Lex IP Meister, PLLC

(57) ABSTRACT

There is provided an electronic book display system, an electronic book display method, and a program in which an electronic book, evaluation information of a product and purchase information necessary for purchasing the product can be visually recognized in the same display area, and a computer automatically associates product information with its evaluation information and purchase information. An electronic book display system includes a display module 141 that displays an electronic book on which product information is described, and a search module 121 that searches for evaluation information associated with the product information or purchase information for purchasing a product corresponding to the product information. The display module 141 displays at least one of the searched evaluation information and purchase information in association with the product information.

12 Claims, 10 Drawing Sheets

(51) Int. Cl.
*G06Q 30/06* (2012.01)
*G06F 3/0483* (2013.01)

(58) Field of Classification Search
USPC .................................................. 705/26, 27
See application file for complete search history.

(56) References Cited

U.S. PATENT DOCUMENTS

| | | | | |
|---|---|---|---|---|
| 7,813,965 | B1* | 10/2010 | Robinson | G06Q 30/0601 |
| | | | | 705/26.1 |
| 8,401,924 | B1* | 3/2013 | Rajyaguru | G06Q 30/0641 |
| | | | | 705/26.61 |
| 8,429,028 | B2* | 4/2013 | Hendricks | G06Q 30/02 |
| | | | | 705/26.7 |
| 9,418,375 | B1* | 8/2016 | Cunico | G06Q 30/0282 |
| 2006/0217959 | A1* | 9/2006 | Saito | G06F 40/253 |
| | | | | 704/2 |
| 2011/0153464 | A1* | 6/2011 | Hendricks | G06Q 30/02 |
| | | | | 705/27.1 |
| 2012/0072547 | A1* | 3/2012 | Henkin | G06F 16/9574 |
| | | | | 709/219 |
| 2012/0299961 | A1* | 11/2012 | Ramkumar | G06T 19/006 |
| | | | | 345/632 |
| 2014/0372216 | A1* | 12/2014 | Nath | G06Q 30/0251 |
| | | | | 705/14.54 |
| 2015/0253942 | A1 | 9/2015 | Kurokawa et al. | |
| 2016/0055256 | A1* | 2/2016 | Look | G06F 16/972 |
| | | | | 715/205 |
| 2017/0345087 | A1* | 11/2017 | Nie | G06Q 30/0643 |

* cited by examiner

FIG. 10

| ID | Proper noun | Appearance frequency | Font information | | | |
|---|---|---|---|---|---|---|
| | | | Size | Color change | Bold | Style change |
| 10001 | CAMERA XXX | 6 | ○ | ○ | ○ | × |
| 10002 | Image quality | 2 | × | × | ○ | × |
| 10003 | Power button | 1 | × | × | × | × |
| 10004 | Shutter | 1 | × | × | × | × |
| | | | | | | | ably
ELECTRONIC BOOK DISPLAY SYSTEM, ELECTRONIC BOOK DISPLAY METHOD, AND PROGRAM

TECHNICAL FIELD

The present invention relates to an electronic book display system, an electronic book display method, and a program for displaying an electronic book in which product information is described and displaying evaluation information and purchase information related to the selected product information in association with each other.

BACKGROUND ART

There has been proposed an electronic book terminal capable of purchasing a product whose purchase intention has increased due to electronic books, without performing a complicated operation such as launching another application (Patent Document 1).

PRIOR ART DOCUMENT

Patent Document

Patent Document 1: Japanese Patent Application Publication No. 2012-103894

SUMMARY OF THE INVENTION

Technical Problem

However, since the method of Patent Document 1 displays a shopping view screen for displaying product information and related book information instead of a book view screen for displaying electronic books within the same application, it is not possible to make purchases in the same display area as a display area which displays the electronic books.

In addition, there is known a method of embedding a link for each product of the electronic book and displaying a WEB page by the HTML (Hyper Text Markup Language) method or the FLASH method which guides product information in the electronic book to a purchase page. However, this method also cannot display evaluation information or information necessary for the purchase in the same display area as the display area displaying the electronic book, as in Patent Document 1. Furthermore, because the web page creator must set the link destination for each product in advance, the time and effort is required to create the web pages.

In view of these problems, an object of the present invention is to provide an electronic book display system, an electronic book display method, and a program in which an electronic book, evaluation information of a product described therein and purchase information necessary for purchasing the product can be visually recognized in the same display area, and a computer automatically associates product information with its evaluation information and purchase information.

Technical Solution

The present invention provides the following solutions.

An invention according to a first aspect provides an electronic book display system including a display unit that displays an electronic book on which product information is described, and a search unit that searches for evaluation information associated with the product information or purchase information for purchasing a product corresponding to the product information, wherein the display unit displays at least one of the searched evaluation information and purchase information in association with the product information of the electronic book.

According to the first aspect of the invention, an electronic book display system includes a display unit that displays an electronic book on which product information is described, and a search unit that searches for evaluation information associated with the product information or purchase information for purchasing a product corresponding to the product information, and the display unit displays at least one of the searched evaluation information and purchase information in association with the product information of the electronic book.

The invention according to the first aspect is a category of an electronic book display system, but even in an electronic book display method and a program, exhibits the same action and effect.

An invention according to a second aspect provides the electronic book display system which is the invention according to the first aspect, wherein the purchase information includes an icon for purchasing the product corresponding to the product information, and the icon is operated to be connected to a computer that executes processing for purchasing the product.

According to the second aspect of the invention, in the electronic book display system which is the invention according to the first aspect, the purchase information includes an icon for purchasing the product corresponding to the product information, and the icon is operated to be connected to a computer that executes processing for purchasing the product.

An invention according to a third aspect provides the electronic book display system, which is the invention according to the first aspect or the second aspect, further including an electronic book receiving unit that receives the electronic book, and a product information extracting unit that extracts the product information from text information embedded in the electronic book, wherein the search unit searches for the evaluation information and the purchase information based on the extracted product information.

According to the third aspect of the invention, the electronic book display system, which is the invention according to the first aspect or the second aspect, further includes an electronic book receiving unit that receives the electronic book, and a product information extracting unit that extracts the product information from text information embedded in the electronic book, and the search unit searches for the evaluation information and the purchase information based on the extracted product information.

An invention according to a fourth aspect provides the electronic book display system which is the invention according to any one of the first aspect to the third aspect, wherein the product information extraction unit extracts the product information based on at least one of an appearance frequency and font information of a proper noun in the text information.

According to the fourth aspect of the invention, in the electronic book display system which is the invention according to any one of the first aspect to the third aspect, the product information extraction unit extracts the product information based on at least one of an appearance frequency and font information of a proper noun in the text information.

An invention according to a fifth aspect provides an electronic book display method including displaying an electronic book on which product information is described, and searching for evaluation information associated with the product information or purchase information for purchasing a product corresponding to the product information, wherein displaying the electronic book on which product information is described includes displaying at least one of the searched evaluation information and purchase information in association with the product information of the electronic book.

An invention according to a sixth aspect provides a program for causing an electronic book display system to cause displaying an electronic book on which product information is described, and searching for evaluation information associated with the product information or purchase information for purchasing a product corresponding to the product information, wherein displaying the electronic book on which product information is described includes displaying at least one of the searched evaluation information and purchase information in association with the product information of the electronic book.

Effects of the Invention

According to the present invention, it is possible to an electronic book display system, an electronic book display method, and a program in which an electronic book, evaluation information of a product described therein and purchase information necessary for purchasing the product can be visually recognized in the same display area, and a computer automatically associates product information with its evaluation information and purchase information.

BRIEF DESCRIPTION OF THE DRAWINGS

FIG. 10 is a diagram showing an example of a data structure for a product information extraction process.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Electronic Book Display System

Figure 1:
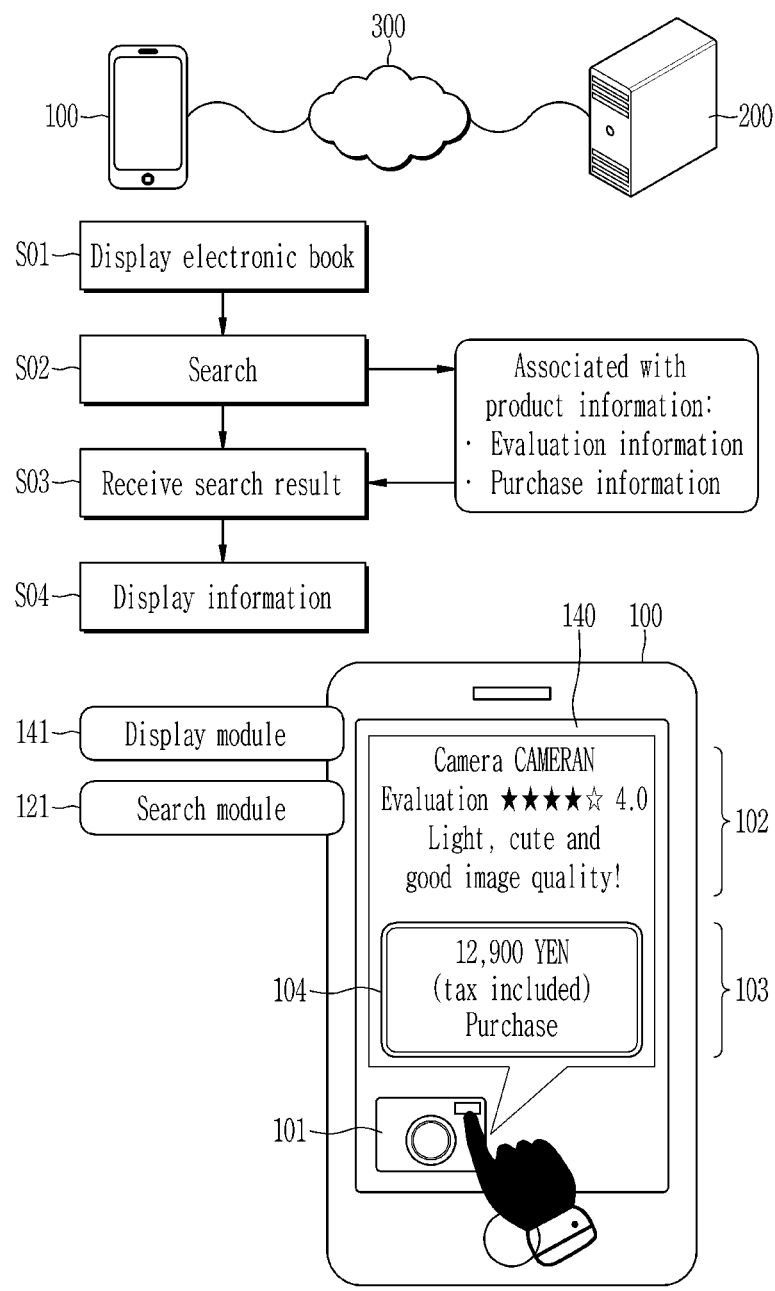
FIG. 1 is a schematic diagram of a preferred embodiment of the present invention.

FIG. 1 is a schematic diagram of a preferred embodiment of the present invention. An overview of the present invention is described with reference to FIG. 1. An electronic book display system includes a terminal 100, a computer 200, and a communication network 300.

In FIG. 1, the number of terminal(s) 100 and the number of computer(s) 200 are not limited to one, and may be two or more. The computer 200 is not limited to an existing device and may be a virtual device.

Figure 2:
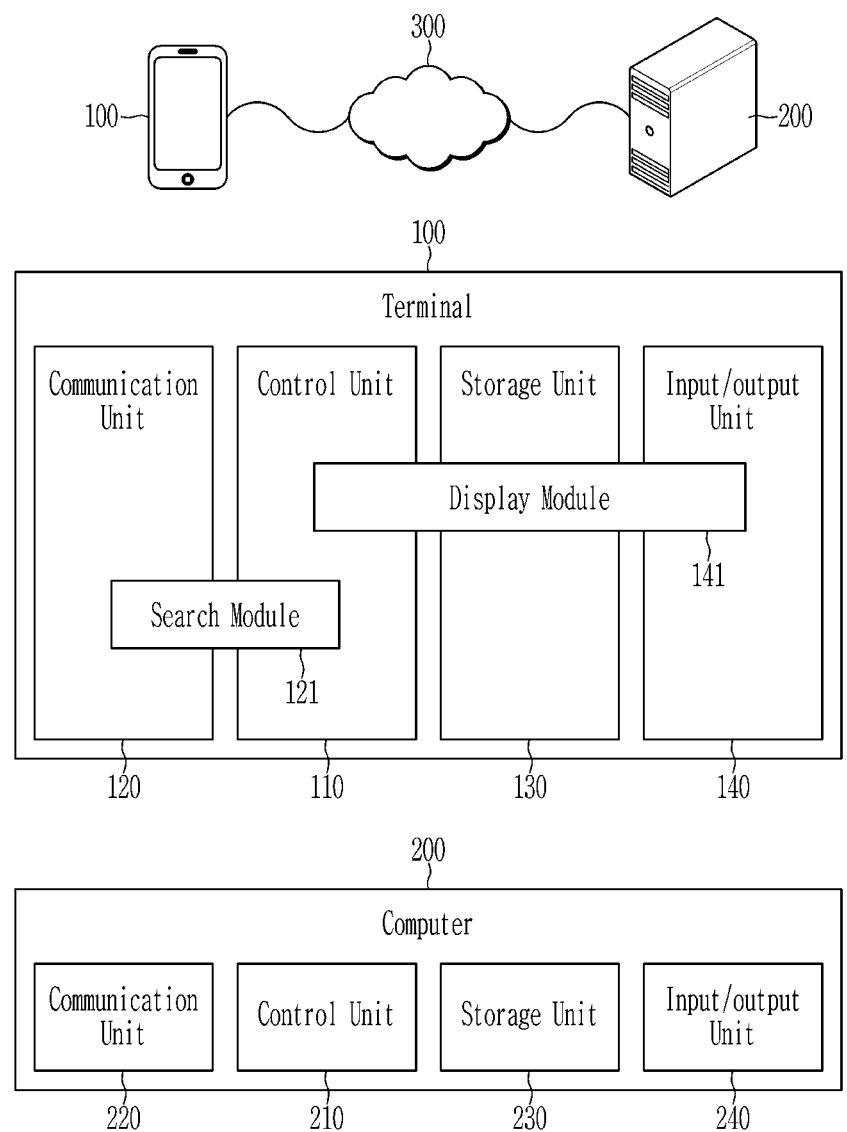
FIG. 2 is a diagram showing relationships between function blocks of a terminal 100 and a computer and respective functions.

As shown in FIG. 2, the terminal 100 includes a control unit 110, a communication unit 120, a storage unit 130, and an input/output unit 140. The input/output unit 140 implements a display module 141 in cooperation with the control unit 110 and the storage unit 130. Further, the communication unit 120 implements a search module 121 in cooperation with the control unit 110. Similarly, as shown in FIG. 2, the computer 200 includes a control unit 210, a communication unit 220, a storage unit 230, and an input/output unit 240. The communication network 300 may be a public communication network such as the Internet or a dedicated communication network, and enables communication between the terminal 100 and the computer 200.

The terminal 100 is a terminal device possessed by a user who uses the electronic book display system. The terminal 100 is, for example, a mobile phone, a portable information terminal, a tablet terminal, a personal computer, an electric appliance such as a netbook terminal, a slate terminal, an electronic book terminal, or a portable music player, a wearable terminal such as a smart glasses or a head mount display, or other goods. The smartphone illustrated as the terminal 100 is merely an example.

In the electronic book display system of FIG. 1, the display module 141 of the terminal 100 first displays an electronic book on the input/output unit 140 (step S01). It is assumed that a name or the like of the product is embedded in the displayed electronic book as text information. In addition, image information such as a photograph may be also embedded in the displayed electronic book. Here, a user's operation on the displayed electronic book is accepted. For example, it is possible to perform general processing required for the electronic book, such as zooming in or out a page of the electronic book, or going to the next page or the previous page. In addition to this processing, the present invention executes processing for displaying necessary information by selecting a product on which the user wants to know another user's evaluation or which the user wants to purchase.

In response to the user's operation for selecting the product, the search module 121 of the terminal 100 performs a search on the computer 200 (step S02). Here, based on the information on the product selected by the user, evaluation information on the corresponding product and purchase information for purchasing the corresponding product are searched. It is assumed that the text information or image information embedded in the electronic book of an area selected by the user may be used for the search of the product information. The evaluation information of the product includes an evaluation score, an evaluator, an evaluation content, an overall evaluation score, the number of evaluators, or the like. Further, the purchase information includes an icon for purchasing the corresponding product, a link of a purchase destination, a price, a stock status, a delivery date, or the like.

Next, the search module 121 receives, from the computer 200, the evaluation information and purchase information searched in step S02 (step S03). When there are a plurality of pieces of evaluation information or purchase information, all of them may be received, or only information with the highest priority may be received. Furthermore, the reception process for a case where there are the plurality of pieces of information may be set by the terminal 100.

Finally, the display module 141 displays at least one of the evaluation information and the purchase information in association with the selected product based on the evaluation information and purchase information acquired in step S03 (step S04). A screen for setting whether to display either the evaluation information or the purchase information, or both of them may be separately provided.

In the lower part of FIG. 1, an example display of the electronic book on the terminal 100 is shown. When the user selects a product 101 while viewing the electronic book, the search module 121 of the terminal 100 performs a search on the computer 200 and receives the result. Based on the received result, the display module 141 displays on the input/output unit 140 the evaluation information 102 and the purchase information 103 in association with the product 101. The displayed purchase information 103 includes a software button 104 which is an icon for purchasing the product 101 selected by the user so that the user can purchase the product 101 by selecting the software button 104.

As described above, according to the present invention, it is possible to an electronic book display system, an electronic book display method, and a program in which an electronic book, evaluation information of a product described therein and purchase information necessary for purchasing the product can be visually recognized in the same display area, and a computer automatically associates product information with its evaluation information and purchase information.

Description of Each Function

FIG. 2 is a diagram showing relationships between function blocks of a terminal 100 and a computer and respective functions. The terminal 100 includes a control unit 110, a communication unit 120, a storage unit 130, and an input/output unit 140. The input/output unit 140 implements a display module 141 in cooperation with the control unit 110 and the storage unit 130. Further, the communication unit 120 implements a search module 121 in cooperation with the control unit 110. The computer 200 includes a control unit 210, a communication unit 220, a storage unit 230, and an input/output unit 240. The communication network 300 may be a public communication network such as the Internet or a dedicated communication network, and enables communication between the terminal 100 and the computer 200.

The terminal 100 is, for example, a mobile phone, a portable information terminal, a tablet terminal, a personal computer, an electric appliance such as a netbook terminal, a slate terminal, an electronic book terminal, or a portable music player, a wearable terminal such as a smart glasses or a head mount display, or other goods. The smartphone illustrated as the terminal 100 is merely an example.

The terminal 100 includes, as the control unit 110, a central processing unit (CPU), a random access memory (RAM), a read only memory (ROM), and the like.

The terminal 100 includes, as the communication unit 120, a device for enabling communication with another device, for example, a WiFi (Wireless Fidelity) compliant device conforming to IEEE 802.11 or a wireless device conforming to the IMT-2000 standard such as a third generation or fourth generation mobile communication system. The communication unit 120 may use a wired LAN connection. The communication unit 120 implements the search module 121 in cooperation with the control unit 110.

The terminal 100 includes, as the storage unit 130, a data storage unit such as a hard disk or a semiconductor memory, and stores data necessary for processing.

The input/output unit 140 is provided with a function necessary to use the electronic book display system. The input/output unit 140 implements the display module 141 in cooperation with the control unit 110 and the storage unit 130. As an example for realizing the input, the input/output unit 140 may include a liquid crystal display for realizing a touch panel function, a keyboard, a mouse, a pen tablet, a hardware button on the device, a microphone for performing voice recognition, or the like. As an example for realizing the output, the input/output unit 140 may include the liquid crystal display, a display of a PC, or a display such as a projection on a projector, and an audio output. The present invention is not particularly limited in functions by the input/output method.

The computer 200 may be a general computer having functions to be described below. Further, the present invention is not limited to an existing device, and may be a virtual device.

The computer 200 includes a CPU, a RAM, a ROM, and the like as the control unit 210.

The computer 200 includes, as the communication unit 220, a device for enabling communication with another device, for example, a WiFi compliant device conforming to IEEE 802.11 or a wireless device conforming to the IMT-2000 standard such as a third generation or fourth generation mobile communication system. The communication unit 220 may use a wired LAN connection.

The computer 200 includes, as the storage unit 230, a data storage unit of data by a hard disk or a semiconductor memory is provided.

As an example for realizing input, the input/output unit 240 may include a liquid crystal display for realizing a touch panel function, a keyboard, a mouse, a pen tablet, a hardware button on the device, a microphone for performing voice recognition, or the like. As an example for realizing the output the input/output unit 240 may include the liquid crystal display, a display of a PC, or a display such as a projection on a projector, and an audio output. The present invention is not particularly limited in functions by the input/output method.

Information Display Process

Figure 3:
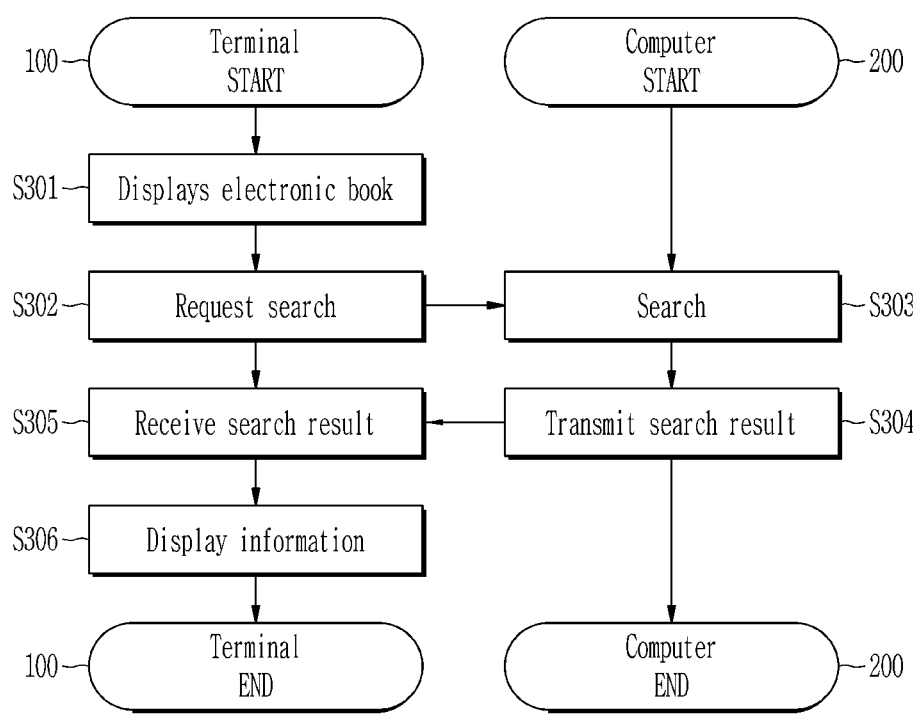
FIG. 3 is a flowchart of a terminal 100 and a computer 200 when a display process of evaluation information and purchase information is performed.

FIG. 3 is a flowchart of a terminal 100 and a computer 200 when a display process of evaluation information and purchase information is performed. The processing executed by each module described above is described together with this processing.

First, a display module 141 of the terminal 100 displays an electronic book on an input/output unit 140 (step S301). It is assumed that a name or the like of the product is embedded in the displayed electronic book as text information. In addition, image information such as a photograph may be also embedded in the displayed electronic book. Here, a user's operation on the displayed electronic book is accepted. For example, it is possible to perform general processing required for the electronic book, such as zooming in or out a page of the electronic book, or going to the next page or the previous page. In addition to this processing, the present invention executes processing for displaying necessary information by selecting a product on which the user wants to know another user's evaluation or which the user wants to purchase.

Figure 9:
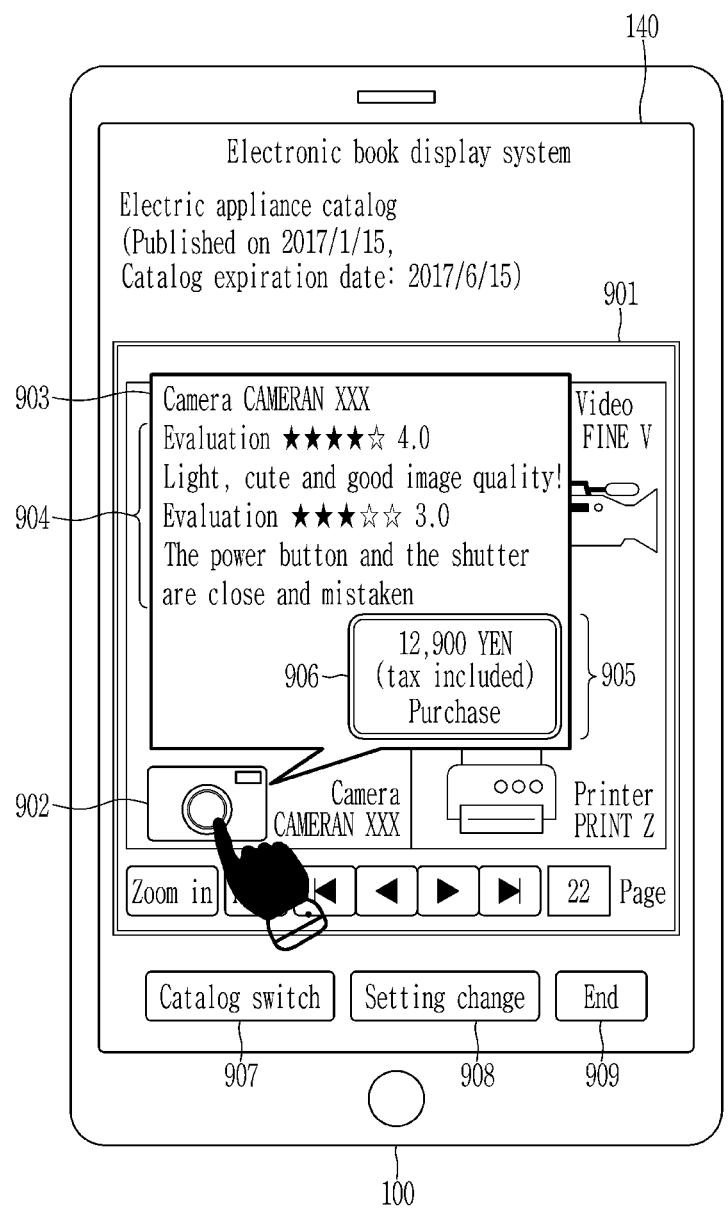
FIG. 9 is a diagram showing an example of an electronic book display screen.

FIG. 9 is a diagram showing an example of an electronic book display screen. Here, an example in which an electric appliance catalog that is an electronic book is displayed on an input-output unit 140 of the terminal 100 is shown in FIG. 9. An electronic book display area 901 displays the electric appliance catalog. At the lower part of the electronic book display area 901, an operation area is provided for the user to zoom in or zoom out a page, to go to the next page or the previous page, or to specify and display the page. In the following, processing in the case where the user selects the product 902 while viewing the electric appliance catalog on the terminal 100 is described.

Returning to the flow of FIG. 3, in response to the user's operation of selecting a product 902, a search module 121 of the terminal 100 sends a search request to the computer 200 (step S302). In order to request the search for evaluation information and purchase information of the corresponding product 902, the text information or image information embedded in the electronic book at an area of the product 902 selected by the user may be also transmitted to the computer 200.

In response to the request from the terminal 100, the computer 200 searches for the evaluation information and purchase information of the corresponding product (step S303). The received text information or image information is used for the search. As the search result, the evaluation information of the product includes an evaluation score, an evaluator, an evaluation content, an overall evaluation score, the number of evaluators, or the like. Further, the purchase information includes an icon for purchasing the corresponding product, a link of a purchase destination, a price, a stock status, a delivery date, or the like.

The computer 200 transmits the search result to the terminal 100 via a communication unit 220 (step S304).

Next, the search module 121 receives the evaluation information and the purchase information from the computer 200 (step S305). If there are a plurality of pieces of evaluation information or purchase information, all of them may be received, or only information with the highest priority may be received. Furthermore, the reception process for a case where there are the plurality of pieces of information may be set by the terminal 100.

Finally, the display module 141 displays at least one of the evaluation information and the purchase information in association with the selected product 902 based on the evaluation information and the purchase information received in step S305 (step S306). A screen for setting whether to display either the evaluation information or the purchase information, or both of them may be separately provided.

FIG. 9 shows an example in which the evaluation information and the purchase information are displayed by a balloon 903. The evaluation information 904 is displayed in the balloon 903. Further, a price of the product 902 and a purchase button 906 are displayed as purchase information 905 in the same balloon 903. Here, the purchase button 906 is an icon for purchasing the product 902 selected by the user, and the user can purchase the product 902 by selecting the purchase button 906. Furthermore, selecting a catalog switch button 907 in the lower part of FIG. 9 may enable the switch for selecting and displaying another electronic book from the currently displayed electronic product catalog. Selecting a setting change button 908 may display a screen for changing the display setting of the product information, such as "display only evaluation information", "display only purchase information", "display both evaluation information and purchase information", or the like. A screen for changing the reception setting, such as "receive all information" or "receive only the information with the highest priority" may be displayed when there are a plurality of pieces of evaluation information or purchase information. In addition, selecting an end button 909 may display a screen for ending the electronic book display system.

As described above, according to the present invention, it is possible to an electronic book display system, an electronic book display method, and a program in which an electronic book, evaluation information of a product described therein and purchase information necessary for purchasing the product can be visually recognized in the same display area, and a computer automatically associates product information with its evaluation information and purchase information.

Figure 4:
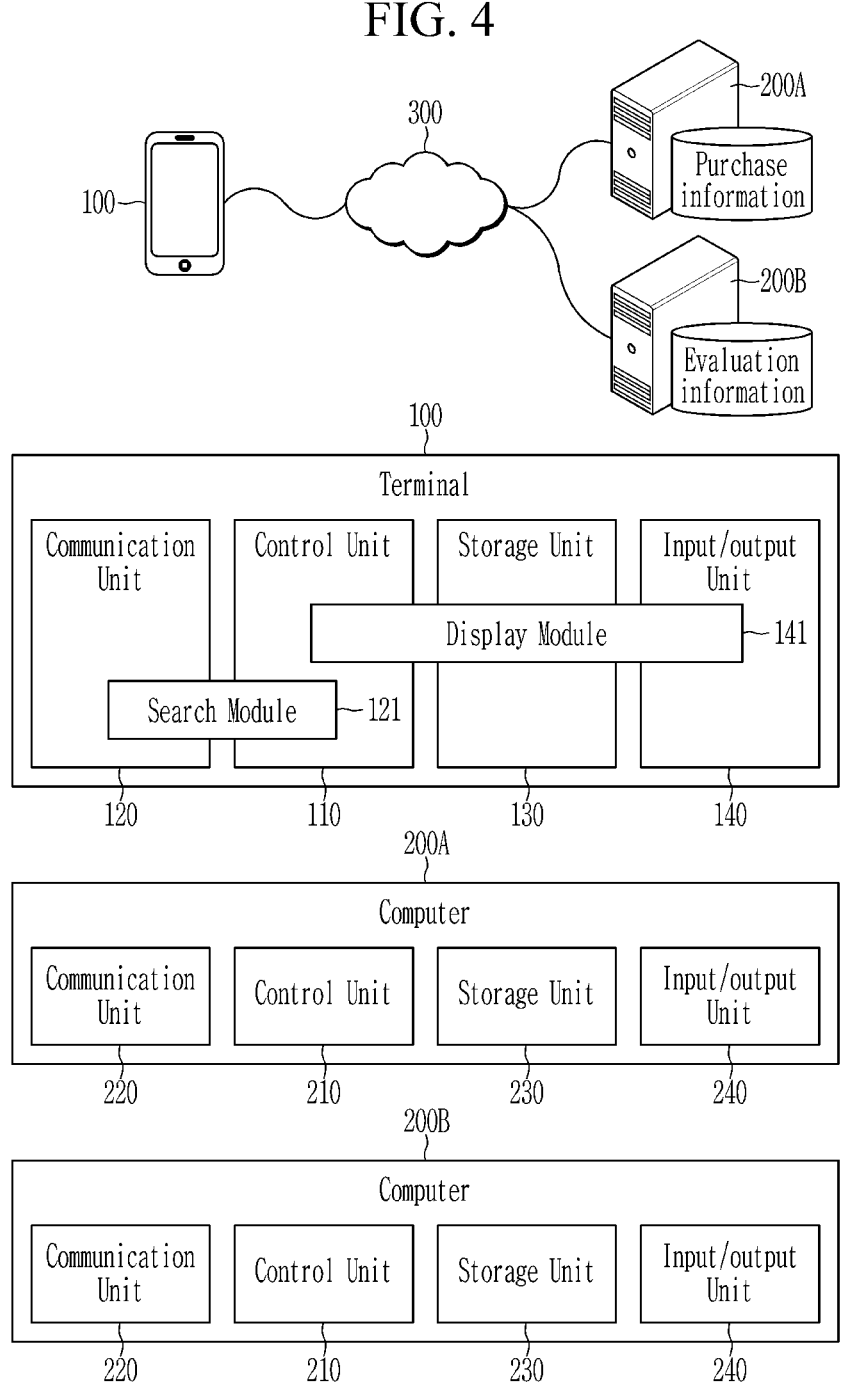
FIG. 4 is a drawing showing relationships between functional blocks of a terminal 100, a computer 200A, and a computer 200B, and respective functions when purchase information and evaluation information are respectively searched from different computers.

Information Display Process when Purchase Information and Evaluation Information are Searched from Different Computers FIG. 4 is a drawing showing relationships between functional blocks of a terminal 100, a computer 200A, and a computer 200B, and respective functions when purchase information and evaluation information are respectively searched from different computers. A configuration of the terminal 100 is the same as that of FIG. 2. Further, the computer 200A and the computer 200B each include a control unit 210, a communication unit 220, a storage unit 230, and an input/output unit 240. Here, the computer 200A is a computer for searching for purchase information, and the computer 200B is a computer for searching for evaluation information. The configurations of the computer 200A and the computer 200B each are the same as that of the computer 200 of FIG. 2. A communication network 300 may be a public communication network such as the Internet or a dedicated communication network, and enables communication between the terminal 100 and the computer 200A and communication between the terminal 100 and the computer 200B. A configuration for performing communication between the computer 200A and the computer 200B is not necessarily required.

Figure 5:
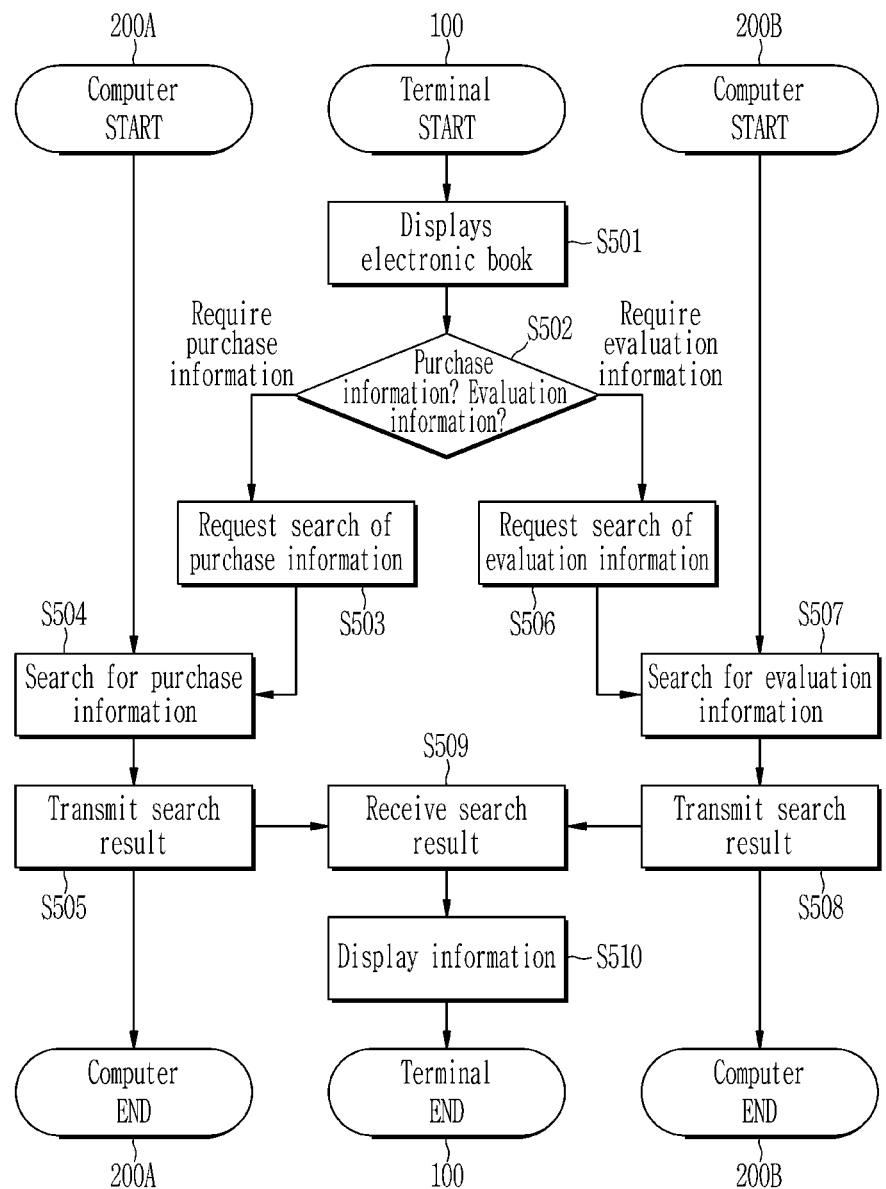
FIG. 5 is a flowchart of a terminal 100, a computer 200A, and a computer 200B when purchase information and evaluation information are respectively searched from different computers.

FIG. 5 is a flowchart of a terminal 100, a computer 200A, and a computer 200B when purchase information and evaluation information are respectively searched from different computers. The processing executed by the module of each device described above is described together with this processing.

First, a display module 141 of the terminal 100 displays an electronic book on an input/output unit 140 (step S501). It is assumed that a name or the like of the product is embedded in the displayed electronic book as text information. In addition, image information such as a photograph may be also embedded in the displayed electronic book. Here, a user's operation on the displayed electronic book is accepted. For example, it is possible to perform general processing required for the electronic book, such as zooming in or out a page of the electronic book, or going to the next page or the previous page. In addition to this processing, the present invention executes processing for displaying necessary information by selecting a product on which the user wants to know another user's evaluation or which the user wants to purchase.

FIG. 9 is a diagram showing an example of an electronic book display screen. Here, an example in which an electric appliance catalog that is an electronic book is displayed on an input-output unit 140 of the terminal 100 is shown in FIG. 9. An electronic book display area 901 displays the electric appliance catalog. At the lower part of the electronic book display area 901, an operation area is provided for the user to zoom in or zoom out a page, to go to the next page or the previous page, or to specify and display the page. Selecting a catalog switch button 907 in the lower part of FIG. 9 may enable the switch for selecting and displaying another electronic book from the currently displayed electronic product catalog. Selecting a setting change button 908 may display a screen for changing the display setting of the product information, such as "display only evaluation information", "display only purchase information", "display both evaluation information and purchase information", or the like. A screen for changing the reception setting, such as "receive all information" or "receive only the information with the highest priority" may be displayed when there are a plurality of pieces of evaluation information or purchase information. In addition, selecting an end button 909 may display a screen for ending the electronic book display system. The display module 141 detects that the user has selected the name or photograph of a product 902 on the electronic book display area 901, and proceeds to a flow for acquiring information on the selected product.

Returning to the flow of FIG. 5, in response to a user's operation of selecting the product 902, a search module 121 of the terminal 100 checks the setting regarding whether product information to be acquired is the purchase information, the evaluation information, or both of them (step S502).

When acquisition of the purchase information is required, a search request for the purchase information is issued to the computer 200A (step S503). In order to request the search for the purchase information of the corresponding product 902, the text information or image information embedded in the electronic book at an area of the product 902 selected by the user may be also transmitted to the computer 200A.

In response to the request from the terminal 100, the computer 200A searches for the purchase information of the corresponding product (step S504). The received text information or image information is used for the search. As the search result, the purchase information includes an icon for purchasing the corresponding product, a link of a purchase destination, a price, a stock status, a delivery date, or the like.

The computer 200A transmits the search result of the purchase information to the terminal 100 via a communication unit 220 (step S505).

The search module 121 of the terminal 100 receives the purchase information from the computer 200A (step S509). If there are a plurality of pieces of purchase information, all of them may be received, or only information with the highest priority may be received. Furthermore, the reception process for a case where there are the plurality of pieces of information may be set by the terminal 100.

When acquisition of the evaluation information is required, a search request for the evaluation information is issued to the computer 200B (step S506). In order to request the search for the evaluation information of the corresponding product 902, text the information or image information embedded in the electronic book at the area of the product 902 selected by the user may be also transmitted to the computer 200B.

In response to the request from the terminal 100, the computer 200B searches for the evaluation information of the corresponding product (step S507). The received text information or image information is used for the search. As the search result, the evaluation information of the product includes an evaluation score, an evaluator, an evaluation content, an overall evaluation score, the number of evaluators, or the like.

The computer 200B transmits the search result of the evaluation information to the terminal 100 via a communication unit 220 (step S508).

The search module 121 of the terminal 100 receives the evaluation information from the computer 200B (step S509). If there are a plurality of pieces of evaluation information, all of them may be received, or only information with the highest priority may be received. Furthermore, the reception process for a case where there are the plurality of pieces of information may be set by the terminal 100.

Finally, the display module 141 displays at least one of the evaluation information and the purchase information in association with the selected product 902 based on the evaluation information and the purchase information received in step S509 (step S510). A screen for setting whether to display either the evaluation information or the purchase information, or both of them may be separately provided.

The flow from step S503 to step S505 and the flow from step S506 to step S508 may be performed in parallel, or the flow corresponding to the display processing of step S510 which is desired to first performed may be first performed.

FIG. 9 shows an example in which the evaluation information and the purchase information are displayed by a balloon 903. The evaluation information 904 is displayed in the balloon 903. Here, although two evaluations are displayed as an example of displaying the plurality of pieces of evaluation information, the number of evaluations to be displayed may be set by the user. Further, if a plurality of evaluations are acquire, the overall evaluation score and the number of evaluators may be displayed. A price of the product 902 and a purchase button 906 are displayed as purchase information 905 in the same balloon 903. Here, the purchase button 906 is an icon for purchasing the product 902 selected by the user, and the user can purchase the product 902 by selecting the purchase button 906. Here, only one purchase button 906 is displayed. However, if the plurality of pieces of purchase information are acquired, a supplier, a price, a delivery date, or the like of the purchase destination may differ, so a plurality of purchase buttons capable of comparing the differences in purchase information may be provided and displayed side by side.

Although FIG. 4 and FIG. 5 show the example in which the purchase information is obtained from the computer 200A and the evaluation information is obtained from the computer 200B, the purchase information and evaluation information each may be obtained from a plurality of computers 200.

As described above, according to the present invention, it is possible to an electronic book display system, an electronic book display method, and a program in which an electronic book, evaluation information of a product described therein and purchase information necessary for purchasing the product can be visually recognized in the same display area, and a computer automatically associates product information with its evaluation information and purchase information.

Electronic Book Reception Process

Figure 6:
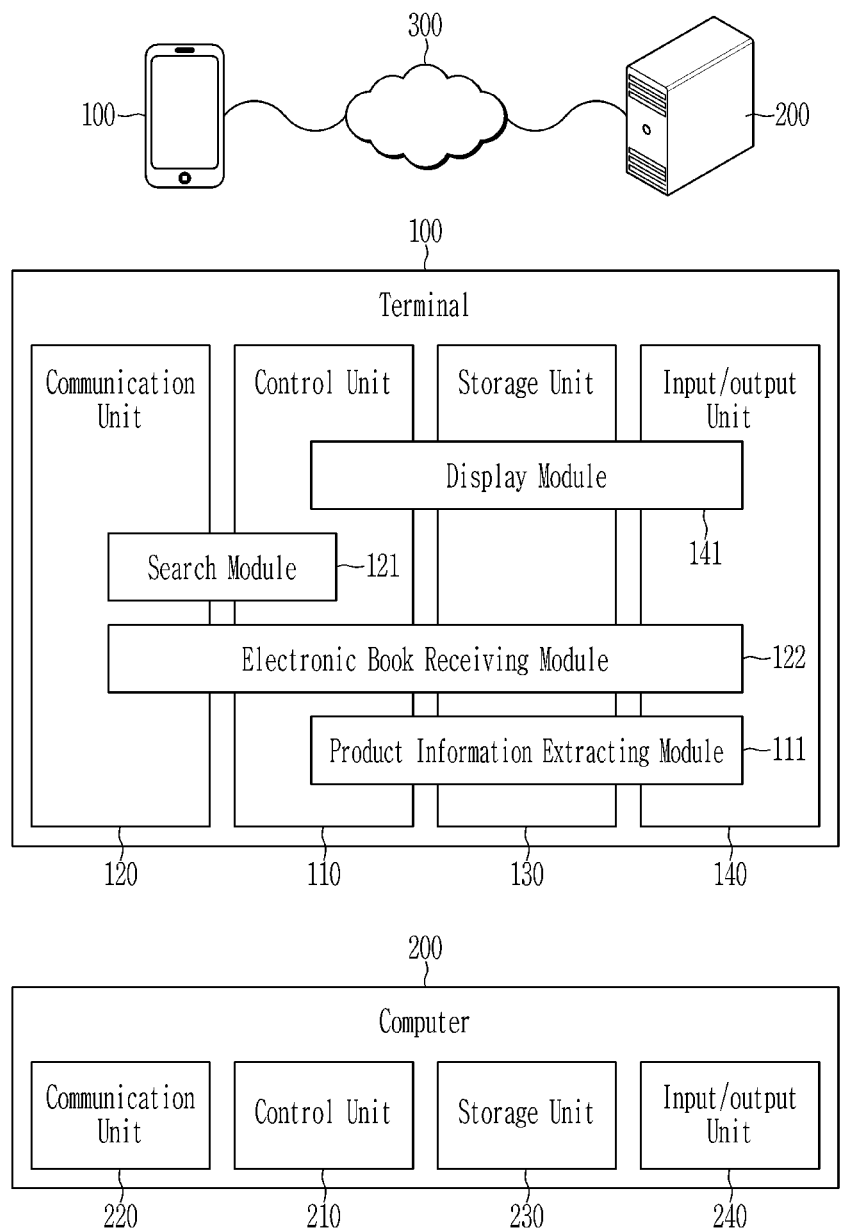
FIG. 6 is a drawing showing relationships between functional blocks of a terminal 100 and a computer 200 and respective functions when an electronic book reception process and a product information extraction process are performed.

FIG. 6 is a drawing showing relationships between functional blocks of a terminal 100 and a computer 200 and respective functions when an electronic book reception process and a product information extraction process are performed. In the terminal 100, in addition to a configuration of FIG. 2, a communication unit 120 implements an electronic book receiving module 122 in cooperation with a control unit 110, a storage unit 130, and an input/output unit 140. Further, the control unit 110 implements a product information extracting module 111 in cooperation with the storage unit 130 and the input/output unit 140. A configuration of the computer 200 is the same as that of FIG. 2. A communication network 300 may be a public communication network such as the Internet or a dedicated communication network, and enables communication between the terminal 100 and the computer 200.

Figure 7:
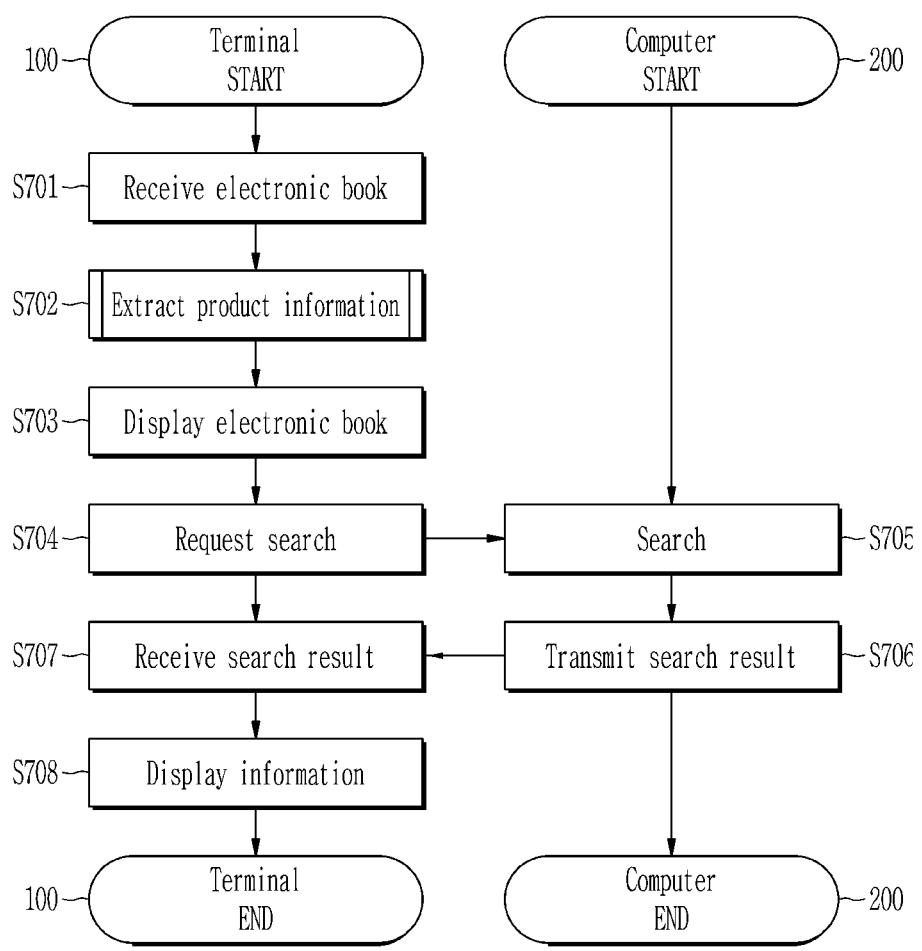
FIG. 7 is a flowchart of a terminal 100 and a computer 200 when an electronic book reception process and a product information extraction process are performed.

FIG. 7 is a flowchart of a terminal 100 and a computer 200 when an electronic book reception process and a product information extraction process are performed. The processing executed by each module described above is described together with this processing.

First, an electronic book receiving module 122 of the terminal 100 receives data of an electronic book (step S701). Here, the electronic book to be received may be an electronic book whose reception is designated by the user via an input/output unit 140, or may be an electronic book regularly distributed. Further, it is assumed that a name or the like of a product is embedded in the electronic book as text information. Image information such as a photograph may be also embedded in the electronic book.

Next, a product information extracting module 111 of the terminal 100 extracts product information based on the text information embedded in the electronic book (step S702). Here, the product information is information necessary for specifying and searching for the product, such as a product name or a model number. Details of the product information extraction process are described below with reference to FIG. 8.

Next, a display module 141 displays the electronic book on the input/output unit 140 (step S703). Here, a user's operation on the electronic book is accepted. For example, it is possible to perform general processing required for the electronic book, such as zooming in or out a page of the electronic book, or going to the next page or the previous page. In addition to this processing, the present invention executes processing for displaying necessary information by selecting a product on which the user wants to know another user's evaluation or which the user wants to purchase.

FIG. 9 is a diagram showing an example of an electronic book display screen. Here, an example in which an electric appliance catalog that is an electronic book is displayed on an input-output unit 140 of the terminal 100 is shown in FIG. 9. An electronic book display area 901 displays the electric appliance catalog. At the lower part of the electronic book display area 901, an operation area is provided for the user to zoom in or zoom out a page, to go to the next page or the previous page, or to specify and display the page. In the following, processing in the case where the user selects the product 902 while viewing the electric appliance catalog on the terminal 100 is described.

Returning to the flow of FIG. 7, in response to the user's operation of selecting a product 902, a search module 121 of the terminal 100 sends a search request to the computer 200 (step S704). In order to request the search for evaluation information and purchase information of the corresponding product 902, the product information of the product 902 extracted in step S702 is transmitted to the computer 200.

In response to the request from the terminal 100, the computer 200 searches for the evaluation information and the purchase information based on the product information of the corresponding product (step S705). For the search, the product name, the model number or the like which is the received product information is used. As the search result, the evaluation information of the product includes an evaluation score, an evaluator, an evaluation content, an overall evaluation score, the number of evaluators, or the like. Further, the purchase information includes an icon for purchasing the corresponding product, a link of a purchase destination, a price, a stock status, a delivery date, or the like.

The computer 200 transmits the search result to the terminal 100 via a communication unit 220 (step S706).

The search module 121 of the terminal 100 receives the evaluation information and the purchase information from the computer 200 (step S 707). If there are a plurality of pieces of evaluation information or purchase information, all of them may be received, or only information with the highest priority may be received. Furthermore, the reception process for a case where there are the plurality of pieces of information may be set by the terminal 100.

Finally, the display module 141 displays at least one of the evaluation information and the purchase information in association with the selected product 902 based on the evaluation information and the purchase information received in step S707 (step S708). A screen for setting whether to display either the evaluation information or the purchase information, or both of them may be separately provided.

FIG. 9 shows an example in which the evaluation information and the purchase information are displayed by a balloon 903. The evaluation information 904 is displayed in the balloon 903. Further, a price of the product 902 and a purchase button 906 are displayed as purchase information 905 in the same balloon 903. Here, the purchase button 906 is an icon for purchasing the product 902 selected by the user, and the user can purchase the product 902 by selecting the purchase button 906. Furthermore, selecting a catalog switch button 907 in the lower part of FIG. 9 may enable the switch for selecting and displaying another electronic book from the currently displayed electronic product catalog. Selecting a setting change button 908 may display a screen for changing the display setting of the product information, such as "display only evaluation information", "display only purchase information", "display both evaluation information and purchase information", or the like. A screen for changing the reception setting, such as "receive all information" or "receive only the information with the highest priority" may be displayed when there are a plurality of pieces of evaluation information or purchase information. In addition, selecting an end button 909 may display a screen for ending the electronic book display system.

As described above, according to the present invention, it is possible to an electronic book display system, an electronic book display method, and a program in which an electronic book, evaluation information of a product described therein and purchase information necessary for purchasing the product can be visually recognized in the same display area, and a computer automatically associates product information with its evaluation information and purchase information.

Product Information Extraction Process

Figure 8:
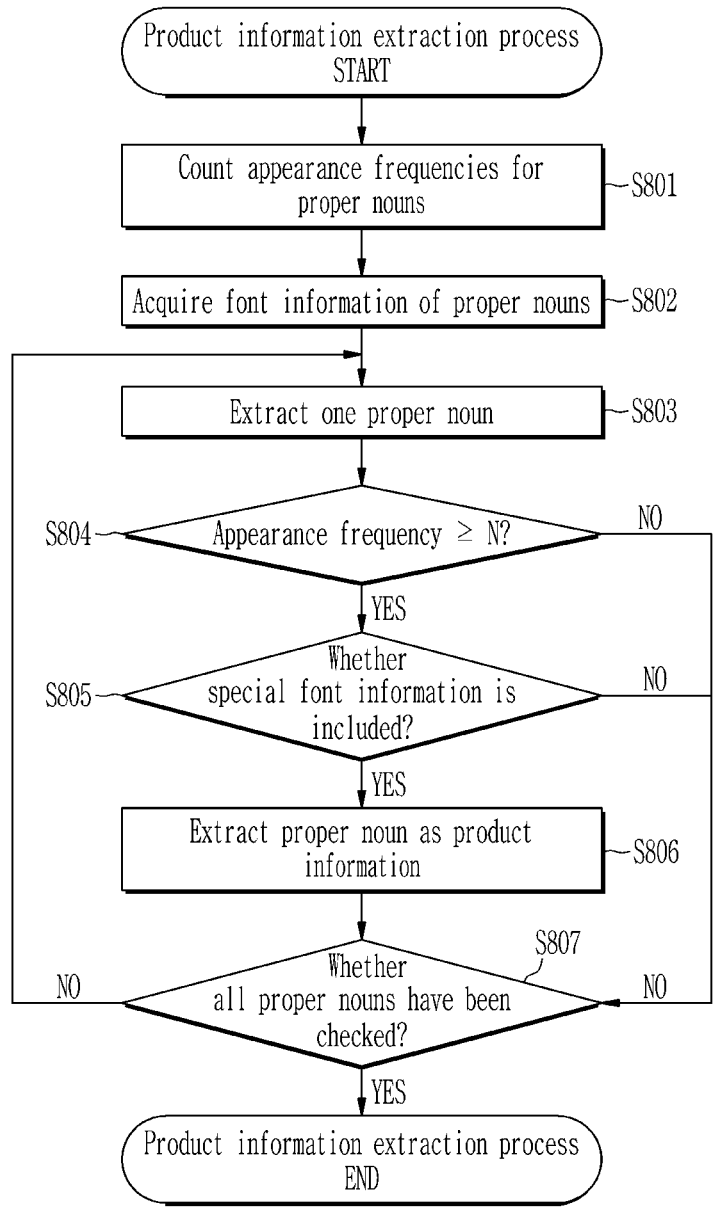
FIG. 8 is a flowchart of a product information extraction process in a terminal 100.

FIG. 8 is a flowchart of a product information extraction process in a terminal 100. This process corresponds to the process of step S702 in the flowchart of FIG. 7.

The processing executed by each module in FIG. 6 described above is described together with this processing.

First, a product information extracting module 111 of the terminal 100 extracts all proper nouns from the text information of the data of the corresponding electronic book, and counts an appearance frequency for each of the proper nouns (step S801). The higher the appearance frequency of the proper noun is, the more likely it is the product information such as the product name or the model number.

Next, a product information extracting module 111 acquires font information from the text information for each proper noun (step S702). When acquiring the font information, attention is paid to whether the font size is larger than usual, whether the color is changed, whether the font is in bold, whether the font style is changed, or the like. In a case where the font size is large, the font color is changed, the font is in bold, or the font style is changed, there is a high possibility that it is the product information such as the product name or the model number. Here, if the proper noun appears more than once when the font information is acquired, the number of times the above-mentioned font information has been changed may be counted, or only whether the font information has been changed may be checked.

FIG. 10 is a diagram showing an example of a data structure for a product information extraction process. Here, it is shown an example in which IDs are assigned to all proper nouns extracted from text information of data of an electronic book, respectively, and in which the number of appearances in the electronic book and the font information have been checked. For example, the ID of "10001" is assigned to the proper noun of "CAMERA XXX", the number of appearances in the electronic book is six times, and the font information indicates that the size is largely changed, the color is changed, and the font is in bold.

Next, a product information extracting module 111 extracts one proper noun in the electronic book (step S803). Here, as the order of extraction, for example, from the data in FIG. 10, the extraction may be sequentially performed from the ID of "10001" in order of ID, or the extraction may be sequentially performed from one with the highest appearance frequency, or the like.

The product information extracting module 111 checks whether the appearance frequency of the extracted proper noun is equal to or more than a threshold N (step S804). Here, since the threshold N is used to determine whether the proper noun is the product information such as the product name or the model number, it may be calculated from a data amount of the text information in the electronic book or an average value of the appearance frequencies of the proper nouns. Here, the process proceeds to the next step S805 if the appearance frequency is equal to or more than the threshold N, and the process proceeds to step S807 if the appearance frequency is less than the threshold N.

Next, the product information extracting module 111 checks whether the extracted proper noun includes special font information (step S805). Here, a method of determining whether the special font information is included may determine whether to satisfy any one or two or more of a condition that the font size is large, a condition that the color is changed, a condition that the font is in bold, a condition that the font style is changed, and the like. Here, the process proceeds to the next step S806 if it is determined that the special font information is included, and the process proceeds to step S807 if it is determined that the special font information is not included. However, if the font information does not include any special one in the text information of the corresponding electronic book, the determination in step S805 may be "YES" and the process may proceed to the next step S806.

The product information extracting module 111 extracts, as the product information, the proper noun whose appearance frequency is equal to or more than the threshold value and which includes the special font information (step S806). If the threshold N in step S804 is 3 and the determination of special font information in step S805 includes the condition that the font is in bold, only "CAMERA XXX" having the ID of 10001 is extracted as the product information in the data example of FIG. 10.

The product information extracting module 111 checks whether the process has been performed for all the proper nouns. The processing returns to step S803 and continues the process if the process has not been performed for all the proper nouns, and the product information extraction process ends if the process has been performed for all the proper nouns (step S807).

Although FIG. 8 shows an example in which the proper noun that satisfies both the condition that the appearance frequency is equal to or greater than the threshold value and the condition that the special font information is included is extracted as the product information, it may be set that the proper noun is extracted as the product information when only one of the conditions is satisfied. In this case, a screen for setting may be separately provided.

As described above, according to the present invention, it is possible to an electronic book display system, an electronic book display method, and a program which automatically extracts the product information of the electronic book by searching for the evaluation information and the purchase information based on the product information extracted by the product information extraction process, and automatically associates the product information with its evaluation information and purchase information by a computer.

The above-described means and functions are realized by reading and executing a predetermined program by a computer (including a CPU, an information processing device, or various terminals). The program may be provided, for example, in a form (SaaS: software as a service) provided from the computer via a network. Further, the program may be provided, for example, in a form recorded in a computer-readable recording medium such as a flexible disk, a CD (e.g., CD-ROM or the like), a DVD (DVD-ROM, DVD-RAM, or the like), a compact memory, or the like. In this case, the computer reads the program from the recording medium and transfers the program to an internal storage unit or an external storage unit to be stored and executed. Furthermore, the program may be recorded in advance in a storage device (recording medium) such as a magnetic disk, an optical disk, an optical magnetic disk, or the like, and be provided from the recording medium to the computer through a communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

100: terminal, 200: computer, 300: communication network

What is claimed is:

1. An electronic book display system comprising:
a display unit that displays an electronic book on which product information is described; and
a search unit that searches for evaluation information associated with the product information or purchase information for purchasing a product corresponding to the product information,
wherein the display unit displays at least one of the searched evaluation information and purchase information in association with the product information of the electronic book in a same display area, by automatically associating the product information with the at least one of the searched evaluation information and purchase information, and displays at least one of a screen for changing a display setting of the product information or a screen for, when a plurality of pieces of the evaluation information or purchase information are searched by the search unit, changing a reception setting of the evaluation or purchase information,
wherein the display setting is changed to any of a plurality of settings including a setting for displaying only the evaluation information, a setting for displaying only the purchase information, and a setting for displaying both the evaluation information and the purchase information, based on an operation, and
wherein the search unit searches for the evaluation information when the display setting is set to the setting for displaying only the evaluation information, searches for the purchase information when the display setting is set to the setting for displaying only the purchase information, and searches for the evaluation information and the purchase information when the display setting is set to the setting for displaying both the evaluation information and the purchase information.

2. The electronic book display system according to claim 1, wherein the purchase information includes an icon for purchasing the product corresponding to the product information, and
wherein the icon is operated to be connected to a computer that executes processing for purchasing the product.

3. The electronic book display system according to claim 1, further comprising:
an electronic book receiving unit that receives the electronic book; and
a product information extracting unit that extracts the product information from text information embedded in the electronic book,
wherein the search unit searches for the evaluation information and the purchase information based on the extracted product information.

4. The electronic book display system according to claim 3, wherein the product information extraction unit extracts the product information based on at least one of an appearance frequency and font information of a proper noun in the text information.

5. An electronic book display method comprising:
displaying an electronic book on which product information is described; and
searching for evaluation information associated with the product information or purchase information for purchasing a product corresponding to the product information,
wherein displaying the electronic book on which product information is described includes displaying at least one of the searched evaluation information and purchase information in association with the product information of the electronic book in a same display area, by automatically associating the product information with the at least one of the searched evaluation information and purchase information, and displaying at least one of a screen for changing a display setting of the product information or a screen for, when a plurality of pieces of the evaluation information or purchase information are searched by the search unit, changing a reception setting of the evaluation or purchase information,
wherein the display setting is changed to any of a plurality of settings including a setting for displaying only the evaluation information, a setting for displaying only the purchase information, and a setting for displaying both the evaluation information and the purchase information, based on an operation, and
wherein the evaluation information is searched when the display setting is set to the setting for displaying only the evaluation information, the purchase information is searched when the display setting is set to the setting for displaying only the purchase information, and the evaluation information and the purchase information are searched when the display setting is set to the setting for displaying both the evaluation information and the purchase information.

6. A non-transitory computer-readable medium that stores a program for causing an electronic book display system to cause:
displaying an electronic book on which product information is described; and
searching for evaluation information associated with the product information or purchase information for purchasing a product corresponding to the product information,
wherein displaying the electronic book on which product information is described includes displaying at least one of the searched evaluation information and purchase information in association with the product information of the electronic book in a same display area, by automatically associating the product information with the at least one of the searched evaluation information and purchase information, and displaying at least one of a screen for changing a display setting of the product information or a screen for, when a plurality of pieces of the evaluation information or purchase information are searched by the search unit, changing a reception setting of the evaluation or purchase information,
wherein the display setting is changed to any of a plurality of settings including a setting for displaying only the evaluation information, a setting for displaying only the purchase information, and a setting for displaying both the evaluation information and the purchase information, based on an operation, and
wherein the evaluation information is searched when the display setting is set to the setting for displaying only the evaluation information, the purchase information is searched when the display setting is set to the setting for displaying only the purchase information, and the evaluation information and the purchase information are searched when the display setting is set to the setting for displaying both the evaluation information and the purchase information.

7. The electronic book display system according to claim 1, wherein the display unit displays both the searched evaluation information and purchase information in association with the product information in the same display area.

8. The electronic book display system according to claim 1, the plurality of pieces of the evaluation information or purchase information are searched by the search unit, the display unit displays the screen for changing the reception setting of the evaluation or purchase information, and wherein the reception setting is changed to any of a plurality of settings including a setting for receiving all of the plurality of pieces of the evaluation information or purchase information and a setting for receiving information having a highest priority among the plurality of pieces of the evaluation information or purchase information.

9. The electronic book display method according to claim 5, wherein displaying the electronic book includes displaying both the searched evaluation information and purchase information in association with the product information in the same display area.

10. The electronic book display method according to claim 5, wherein when the plurality of pieces of the evaluation information or purchase information are searched by the search unit, displaying the electronic book includes displaying the screen for changing the reception setting of the evaluation or purchase information, and wherein the reception setting is changed to any of a plurality of settings including a setting for receiving all of the plurality of pieces of the evaluation information or purchase information and a setting for receiving information having a highest priority among the plurality of pieces of the evaluation information or purchase information.

11. The non-transitory computer-readable medium according to claim 6, wherein displaying the electronic book includes displaying both the searched evaluation information and purchase information in association with the product information in the same display area.

12. The non-transitory computer-readable medium according to claim 6, wherein when the plurality of pieces of the evaluation information or purchase information are searched by the search unit, displaying the electronic book includes displaying the screen for changing the reception setting of the evaluation or purchase information, and wherein the reception setting is changed to any of a plurality of settings including a setting for receiving all of the plurality of pieces of the evaluation information or purchase information and a setting for receiving information having a highest priority among the plurality of pieces of the evaluation information or purchase information.

\* \* \* \* \*